United States Patent
Sardeshmukh et al.

(10) Patent No.: US 12,496,313 B2
(45) Date of Patent: *Dec. 16, 2025

(54) PHARMACEUTICAL HERBO-MINERAL METALLIC COMPOSITION AND A PROCESS FOR PREPARATION THEREOF

(71) Applicant: Sadanand Prabhakar Sardeshmukh, Pune (IN)

(72) Inventors: Sadanand Prabhakar Sardeshmukh, Pune (IN); Vineeta Vasant Deshmukh, Pune (IN)

(73) Assignee: Sadanand Sardeshmukh, Pune (IN)

( * ) Notice: Subject to any disclaimer, the term of this patent is extended or adjusted under 35 U.S.C. 154(b) by 1030 days.

This patent is subject to a terminal disclaimer.

(21) Appl. No.: 17/609,535

(22) PCT Filed: Feb. 12, 2020

(86) PCT No.: PCT/IB2020/051114
§ 371 (c)(1),
(2) Date: Nov. 8, 2021

(87) PCT Pub. No.: WO2020/225609
PCT Pub. Date: Nov. 12, 2020

(65) Prior Publication Data
US 2022/0211753 A1  Jul. 7, 2022

(30) Foreign Application Priority Data
May 7, 2019 (IN) .............................. 201921018272

(51) Int. Cl.
| A61K 35/02 | (2015.01) |
| A61K 9/00 | (2006.01) |
| A61K 9/20 | (2006.01) |
| A61K 33/24 | (2019.01) |
| A61K 36/53 | (2006.01) |
| A61K 36/59 | (2006.01) |

(52) U.S. Cl.
CPC ............ *A61K 35/02* (2013.01); *A61K 9/0053* (2013.01); *A61K 9/2068* (2013.01); *A61K 33/24* (2013.01); *A61K 36/53* (2013.01); *A61K 36/59* (2013.01)

(58) Field of Classification Search
CPC .... A61K 35/02; A61K 9/0053; A61K 9/2068; A61K 33/24; A61K 36/53; A61K 36/59; A61K 9/2009; A61K 9/2095; A61K 2236/00
See application file for complete search history.

(56) References Cited

U.S. PATENT DOCUMENTS
2018/0318374 A1  11/2018  Shetty
2022/0226419 A1*  7/2022  Sardeshmukh ........ A61K 47/36

FOREIGN PATENT DOCUMENTS
GB   2314270 A   * 12/1997 ........... A61K 36/185

OTHER PUBLICATIONS

Kulkarni, S. S. Bhasma and Nanomedicine. International Research Journal of Pharmacy, 4(4), pp. 10-16. (Year: 2013).*
Deshmukh, V. et.al, Effectiveness of combinations of Ayurvedic drugs in alleviating drug toxicity and improving quality of life of cancer patients treated with chemotherapy. Supportive Care in Cancer, (2014), 22 (11), 3007-3015. Retrieved Nov. 8, 2021; doi:10.1007/s00520-014-2294-0.
Thakur, K., et al., "Preparation and Characterization of Suvarna Bhasma Parada Marit." Journal of pharmacopuncture, (2017) vol. 20,1 : 36-44. Retrieved Nov. 8, 2021; doi:10.3831/KPI.2017.20.007.
Sawant, R.S., "Comparative study of mukta bhasma & mukta pishti With reference to their particle size" International Journal of Ayurvedic Medicine, (2015), 6(1) Supplement, 122-128. Retrieved Nov. 8, 2021; Published online in http://ijam. co. in.
Bhang, P.V. et al., "Pharmaceutical Study of Guduchi Satva using the Advanced Technology-Multi Mill." Int J Complement Alt Med (2017), 7 (2) : 0 0 218 . DOI: 10.15406/ijcam.2017.07.00218.
Pal, D. et al., Bhasma : The ancient Indian nanomedicine. Journal of Advanced Pharmaceutical Technology & Research, 2014;5:4-12. Retrieved Nov. 8, 2021, DOI: 10.4103/2231-4040.126980.
TKDL Database: Abstract Id: RS22/165, Title: Svarna Bhasma Anupana, Bibliography: Rasatantrasra Evam Siddhaprayogasagraha; Knowledge Known Since: 50 years.
TKDL Database: Abstract Id: AK1/349C, Title: Suvarna Bhasma Amayika Prayoga-3, Bibliography: Rasatara,gi'o, Knowledge Known Since 50years.
TKDL Database: Abstract Id: RS3/1111B, Title: Svarnabhasmaraja Mrgankarasa, Bibliography: B' hadrasarjasundara , Knowledge Known Since: 100 years.
PCT International Search Report for International Application No. PCT/IB2020/051114, mailed Jul. 23, 2020, 2pp.
PCT Written Opinion for International Application No. PCT/IB2020/051114, mailed Jul. 23, 2020, 6pp.

* cited by examiner

*Primary Examiner* — Jessica Worsham
(74) *Attorney, Agent, or Firm* — The Roy Gross Law Firm, LLC; Roy D. Gross

(57) ABSTRACT

The present disclosure relates to a pharmaceutical herbo-mineral-metallic composition and its process of preparation. The pharmaceutical herbo-mineral-metallic composition comprises Suvarna bhasma, wherein the Suvarna bhasma is obtained by stabilizing Suvarna with fresh juice of the leaves of *Ocimum sanctum*, Mouktik bhasma, Guduchi sattva, and at least one excipient. The pharmaceutical herbo-mineral-metallic composition of the present disclosure can be used for alleviating disease induced and therapy induced adverse effects. It can also improve quality of life of the patients as assessed by Karnofsky score and wellbeing by QLQ CTC 30 score. The pharmaceutical herbo-mineral-metallic composition of the present disclosure can be beneficial in increasing disease free survival and overall survival in various cancers. It is not toxic in nature when consumed for a long period of time.

8 Claims, 8 Drawing Sheets

PHARMACEUTICAL HERBO-MINERAL METALLIC COMPOSITION AND A PROCESS FOR PREPARATION THEREOF

CROSS REFERENCE TO RELATED APPLICATIONS

This application is a National Phase of PCT Patent Application No. PCT/IB2020/051114, having International filing date of Feb. 12, 2020, which claims the benefit of priority of Indian Patent Application number 201921018272, filed May 7, 2019, the contents of which are all incorporated herein by reference in their entirety.

FIELD

The present disclosure relates to a pharmaceutical herbo-mineral-metallic composition and a process for preparation thereof. Particularly, the present disclosure relates to a pharmaceutical herbo-mineral-metallic composition for improving quality of life and survival

ABBREVIATIONS

WBC: White blood cells.
SGOT: Serum glutamic oxaloacetic transaminase.
SGPT: Serum glutamic pyruvic transaminase.
SBDIASBD: The pharmaceutical herbo-mineral metallic composition of the present disclosure
RSR: Respective survival rate
QoL: Quality of Life
QLQ C 30: Quality of Life Questionnaire

DEFINITIONS

As used in the present disclosure, the following terms are generally intended to have the meaning as set forth below, except to the extent that the context in which they are used indicate otherwise.

Suvarna bhasma: The term "Suvarna bhasma" refers to "incinerated gold" prepared by incinerating gold.

Mouktik bhasma: The term "Mouktik bhasma" refers to "incinerated pearl" prepared by incinerating pearl.

Guduchi Sattva: The term "Guduchi Sattva" refers to an extract comprising mainly starch of *Tinospora cordifolia/ sinensis/crispa/glabra* prepared by alcoholic, hydro-alcoholic or aqueous extraction method.

Suvarna: The term "Suvarna" refers to "24 Karat Gold".

Mouktik: The term "Mouktik" refers to "Pearl".

Vati: The term "Vati" refers to a method of medicine preparation in which herbs, minerals and metallic compounds are compressed into tablet form.

Trituration: The term "trituration" refers to either reducing the particle size of a substance or production of a homogeneous material by mixing component materials thoroughly or wet grinding any material with a liquid media like fresh juice or decoction etc.

Karnofsky score: The term "Karnofsky score" refers to the Karnofsky Performance Scale Index allows patients to be classified as to theft functional impairment Symptom score: Symptom score of QLQ is indicative of symptomatology; hence decrease in symptom score represents both decrease in disease related symptoms and adverse effects of conventional treatment.

Function score: Functional score of QLQ signifies status of routine physical activities. Increase in functional scores represents improvement in QoL.

Global score: Global score of QLQ represents overall well-being of a patient. Increase in global scores represents improvement in QoL.

BACKGROUND

The background information herein below relates to the present disclosure but is not necessarily prior art.

Various diseases such as viral infections, allergic diseases, long term chronic diseases, exposure to toxic chemicals, etc. are known to cause debility in patients. Some of the examples of such diseases are HIV/AIDS, Chikengunia and other mutated viruses; allergic bronchitis, asthma; hazards like metal toxicity, mining etc. In most of these conditions, quality of life of the patients is hampered. In extreme conditions, it may cause permanent damage also.

A very obvious example of one such condition is cancer. Cancer is one of the leading causes of morbidity and mortality in developing and developed countries. The number of new cases is expected to rise over the next 2 decades.

The existing modalities of treatment of cancer include surgery, radiotherapy and chemotherapy. Advanced cancers often do not respond to even accelerated chemotherapy, thereby leaving very little option for treatment. Radiation and chemotherapy often cause deleterious side-effects interfering therapeutic schedule of these treatment modalities and often hamper Quality of Life of the patients. This also leads to debility of the patients. Even after conventional therapies, recurrence and metastasis are difficult to control resulting in low survival rate.

Efforts have been made to overcome the problem of debility, adverse side effects and limited survival by using alternative or adjunct therapies. However, these therapies used so far did not show effective outcome with respect to above problems.

Therefore, there is felt a need to provide a selected combination of herbal, mineral and metallic compositions, that mitigates the aforestated problems.

OBJECTS

Some of the objects of the present disclosure, which at least one embodiment herein satisfies, are as follows:

An object of the present disclosure is to ameliorate one or more problems of the prior art or to at least provide a useful alternative.

Another object of the present disclosure is to provide a pharmaceutical herbo-mineral metallic composition.

Yet another object of the present disclosure is to provide a process for preparing a pharmaceutical herbo-mineral metallic composition Yet another object of the present disclosure is to provide a pharmaceutical herbo-mineral metallic composition that improves and maintains quality of life of cancer patients by alleviating adverse effects due to chemotherapy and radiotherapy.

Still another object of the present disclosure is to provide a pharmaceutical herbo-mineral metallic composition that increases Disease Free Survival (DFS) or Overall Survival (OS) of cancer patients.

Other objects and advantages of the present disclosure will be more apparent from the following description, which is not intended to limit the scope of the present disclosure.

SUMMARY

The present disclosure provides a pharmaceutical herbo-mineral-metallic composition comprising Suvarna bhasma in an amount ranging from 2 wt % to 7 wt % of the total weight of the composition, Mouktik bhasma in an amount ranging from 20 wt % to 35 wt % of the total weight of the composition, Guduchi sattva in an amount ranging from 45 wt % to 60 wt % of the total weight of the composition, and at least one excipient in an amount ranging from 5 wt % to 30 wt % of the total weight of the composition.

In an embodiment of the present disclosure, there is provided a pharmaceutical herbo-mineral-metallic composition comprising Suvarna bhasma in an amount ranging from 3 wt % to 5 wt % of the total weight of the composition, Mouktik bhasma in an amount ranging from 23 wt % to 30 wt % of the total weight of the composition, Guduchi sattva in an amount ranging from 48 wt % to 54 wt % of the total weight of the composition, and at least one edible binder in an amount ranging from 10 wt % to 25 wt % of the total weight of the composition.

In exemplary embodiment of the present disclosure, there is provided a pharmaceutical herbo-mineral-metallic composition comprising Suvarna bhasma in an amount of 4 wt % of the total weight of the composition, Mouktik bhasma in an amount of 26 wt % of the total weight of the composition, Guduchi sattva in an amount of 52 wt % of the total weight of the composition and at least one edible gum in an amount of 18 wt % of the total weight of the composition.

In accordance with the embodiment of the present disclosure, the Suvarna bhasma is obtained by stabilizing incinerated Suvarna particles having a particle size in the range of 20 nm to 500 nm, with fresh juice of *Ocimum sanctum* leaves.

In accordance with the embodiment of the present disclosure, the excipient is selected from the group consisting of gum acacia, guar gum, xanthan gum and other edible gums.

The pharmaceutical herbo-mineral-metallic composition is prepared in the form of a solid unit dosages selected from the group consisting of tablet, pill and capsule.

The present disclosure further provides a process for preparing the pharmaceutical herbo-mineral metallic composition. The process comprises mixing of Suvarna bhasma, Mouktik bhasma, Guduchi sattva, and at least one excipient to obtain a mixture, wherein the Suvarna bhasma is obtained by stabilizing incinerated Suvarna particles having a particle size in the range of 20 nm to 500 nm with fresh juice of *Ocimum sanctum* leaves (black Tulsi). Water is added to the mixture to obtain dough, followed by pelletizing the dough to obtain pellets. The pellets are dried to obtain dried pellets. The dried pellets are grinded to obtain granules. The so obtained granules are compressed to obtain the pharmaceutical herbo-mineral metallic composition.

The Suvarna bhasma is prepared by the process comprising amalgamation of Suvarna with metallic mercury and sulphur powder to obtain amalgamated Suvarna, followed by incinerating the amalgamated Suvarna at a temperature in the range of 650° C. to 700° C. to obtain incinerated Suvarna. The incinerated Suvarna is stabilized by triturating with fresh juice of *Ocimum sanctum* leaves to obtain triturated Suvarna. The triturated Suvarna is stabilized by incinerating at a temperature in the range of 550° C. to 650° C. to obtain Suvarna bhasma having particle size in the range of 20 to 500 nm.

The present disclosure also discloses a process for the preparation of Mouktik bhasma and Guduchi sattva.

The Mouktik bhasma is prepared by the process which comprises purification of Mouktik (pearl) in butter milk having Mouktik to buttermilk ratio of 1:4 (w/v) and buttermilk having curd to water ratio of 1:2 (w/v) and pH in the range of 3 to 4 to obtain purified Mouktik. The purified Mouktik is triturated with Rose water having ratio of Mouktik to rose water as 1:0.5 (w/v), followed by incinerating at 700° C. to 750° C. to obtain Mouktik bhasma.

The Guduchi sattva is prepared by the process which comprises macerating previously pounded and soaked stem pieces of Tinospora species in water having Guduchi to water ratio as 1:4 (w/v), followed by filtration to obtain a filtrate. The filtrate is set aside for a period of 6 hours to 15 hours or is centrifuged to obtain supernatant and smooth starchy sediment of Tinospora. The supernatant is separated to obtain smooth starchy sediment of Tinospora which is dried at a temperature in the range of 40° C. to 45° C. to obtain the Guduchi sattva.

BRIEF DESCRIPTION OF THE ACCOMPANYING DRAWING

The present disclosure will now be described with the help of the accompanying drawing, in which.

DETAILED DESCRIPTION

Figure 1A:
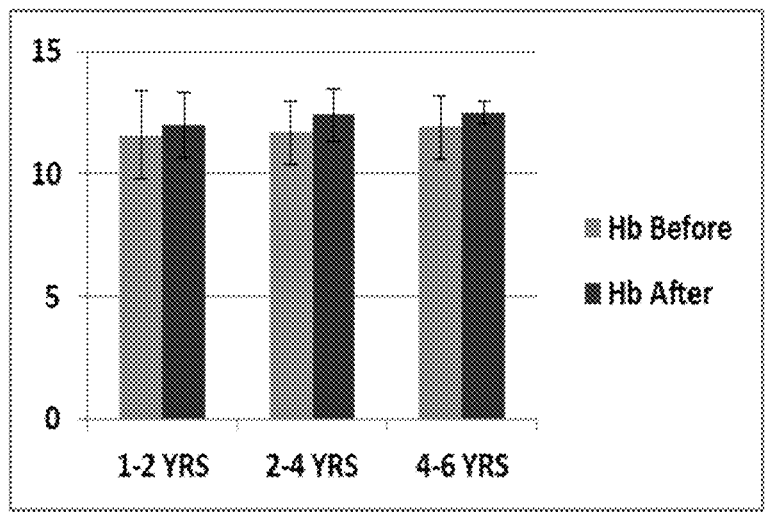
FIG. 1A depicts a graphical representation of Hemoglobin before and after the pharmaceutical herbo-mineral metallic composition treatment in cancer patients.
Figure 1B:
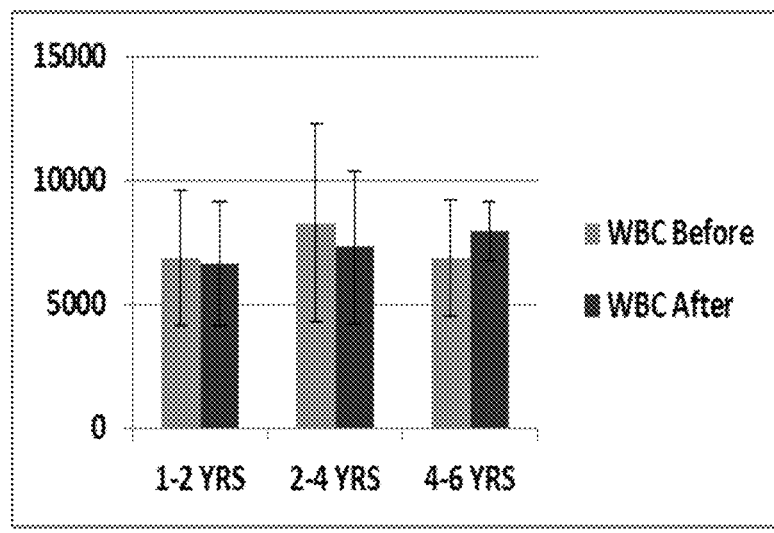
FIG. 1B depicts a graphical representation of WBC count before and after the pharmaceutical herbo-mineral metallic composition treatment in cancer patients.
Figure 1C:
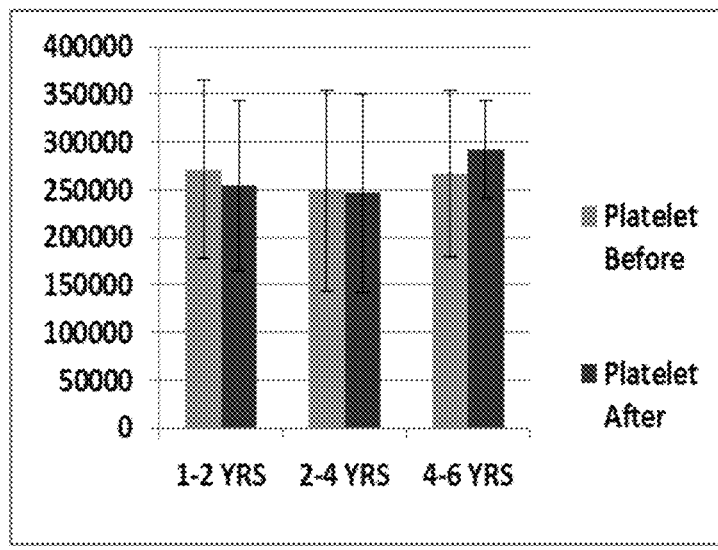
FIG. 1C depicts a graphical representation of Platelet count before and after the pharmaceutical herbo-mineral metallic composition treatment in cancer patients.
Figure 1D:
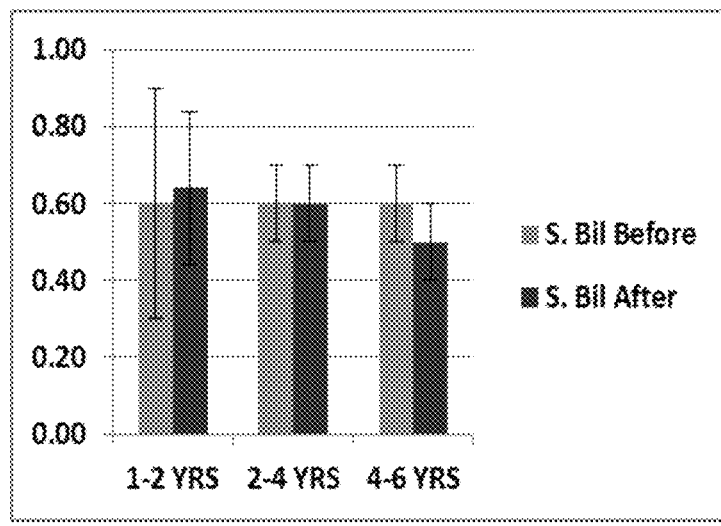
FIG. 1D depicts a graphical representation of Serum bilirubin before and after the pharmaceutical herbo-mineral metallic composition treatment in cancer patients.
Figure 1E:
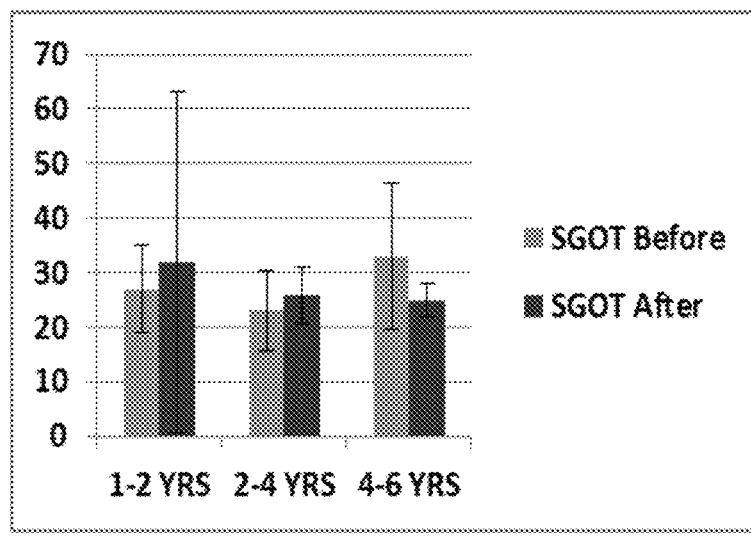
FIG. 1E depicts a graphical representation of SGOT before and after the pharmaceutical herbo-mineral metallic composition treatment in cancer patients.
Figure 1F:
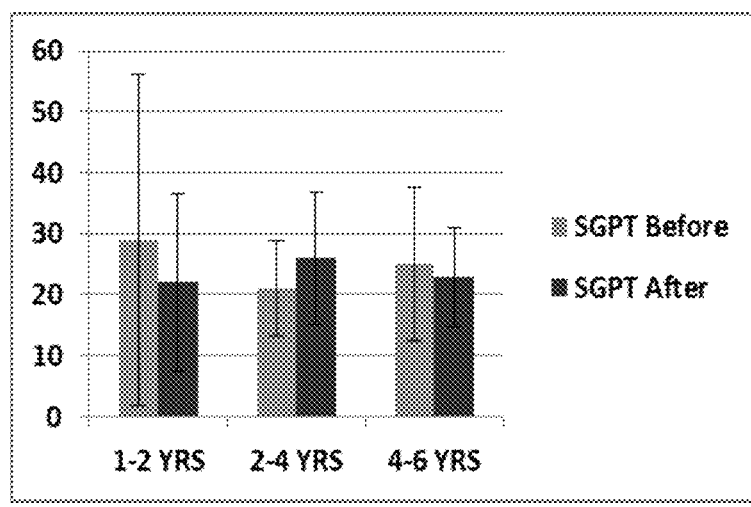
FIG. 1F depicts a graphical representation of SGPT before and after the pharmaceutical herbo-mineral metallic composition treatment in cancer patients.
Figure 1G:
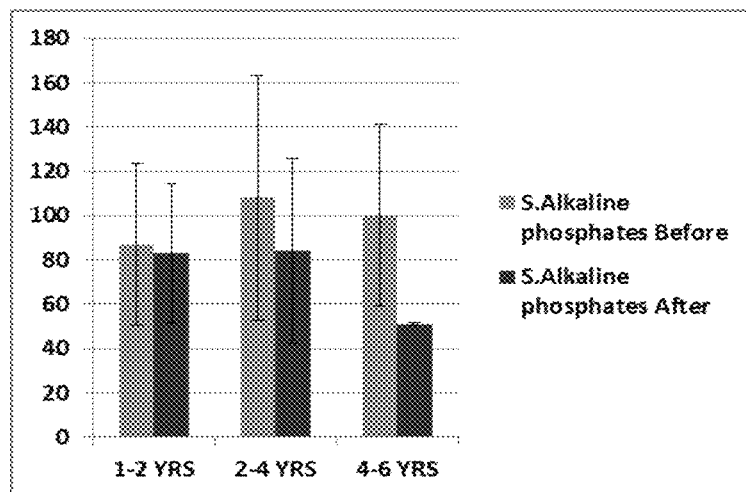
FIG. 1G depicts a graphical representation of serum alkaline phosphatase before and after the pharmaceutical herbo-mineral metallic composition treatment in cancer patients.
Figure 1H:
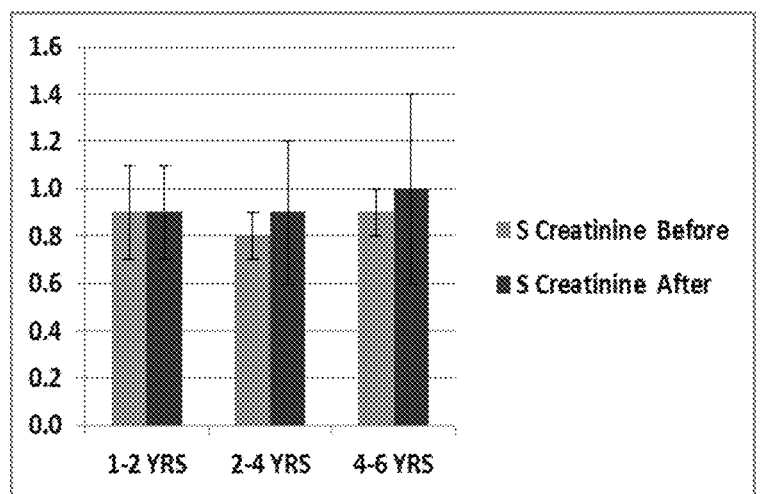
FIG. 1H depicts a graphical representation of serum creatinine before and after the pharmaceutical herbo-mineral metallic composition treatment in cancer patients.

Embodiments of the present disclosure will now be described with reference to the accompanying drawings.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The incidence of cancer is increasing worldwide. Although radiotherapy takes care of primary lesion as a site-directed therapy, chemotherapy is used to reduce the primary tumor load as well as distant metastasis. These modalities of treatment are unavoidable lines of treatment for cancer patients, and the adverse side effects of these modalities sometimes interfere with continuation of the treatment. These destructive effects result in impairment of quality of life of patients.

It is an accepted fact that in large number of cancer patients, the conventional therapy of radiation and chemotherapy are very often unable to control recurrence or metastasis of cancer. This also results in impairment in Quality of Life of a patient throughout his life-span.

Because of the recurrence of cancer and/or spread of the disease all over the body, the conventional modality of treatment as well as surgery no more remain choice of treatment causing death of patients. This is an acute problem in cancer causing low survival period with metastasis/recurrence (Overall Survival-OS) or without metastasis/recurrence (Disease Free Survival-DFS).

Therefore, the present disclosure provides a pharmaceutical herbo-mineral-metallic composition well tolerated by patients that mitigates the aforestated problems such as hampered Quality of Life and survival.

In an aspect of the present disclosure, there is provided a pharmaceutical herbo-mineral-metallic composition that improves and maintains quality of life of cancer patients by alleviating adverse effects due to chemotherapy and radiotherapy.

The pharmaceutical herbo-mineral metallic composition comprises Suvarna bhasma in an amount ranging from 2 wt % to 7 wt % of the total weight of the composition, Mouktik bhasma in an amount ranging from 20 wt % to 35 wt % of the total weight of the composition, Guduchi sattva in an amount ranging from 45 wt % to 60 wt % of the total weight of the composition, and at least one excipient in an amount ranging from 5 wt % to 30 wt % of the total weight of the composition.

In an embodiment of the present disclosure, there is provided a pharmaceutical herbo-mineral-metallic composition comprising Suvarna bhasma in an amount ranging from 3 wt % to 5 wt % of the total weight of the composition, Mouktik bhasma in an amount ranging from 23 wt % to 30 wt % of the total weight of the composition, Guduchi sattva in an amount ranging from 48 wt % to 54 wt % of the total weight of the composition, and at least one edible binder in an amount ranging from 10 wt % to 25 wt % of the total weight of the composition.

In an exemplary embodiment of the present disclosure, there is provided a pharmaceutical herbo-mineral-metallic composition. The pharmaceutical herbo-mineral-metallic composition comprises Suvarna bhasma in an amount of 4 wt % of the total weight of the composition, Mouktik bhasma in an amount of 26 wt % of the total weight of the composition, Guduchi sattva in an amount of 52 wt % of the total weight of the composition and at least one edible gum in an amount of 18 wt % of the total weight of the composition.

Suvarna bhasma is known as incinerated gold and Mouktik bhasma is known as incinerated pearl. The amount of the Suvarna Bhasma below 2 wt % will be sub-therapeutic and in quantities greater than 7 wt %, there will be an overload of the Suvarna Bhasma which will be excreted. Similarly, the lower and upper weight percentages of the other ingredients i.e. Mouktik Bhasma and Guduchi Sattva have been titrated in this formulation keeping the above principle in mind. Ideally, after experimentation it is found that for optimum effect of SBD the composition should contain 4 wt % Suvarna Bhasma, 26 wt % Mouktik Bhasma and 52 wt % Guduchi Sattva which are bound together with a natural gum such as gum acacia to the extent of 18 wt c/o. The ingredients in powder form are blended together. The natural gum is added to the powder blend to form dough with purified water. Pellets are formed from this dough having average weight of 5 gm each. These pellets are tray dried typically at temperature in the range of 40-45° C. The dried pellets are granulated in a mixer grinder and the dry granules are taken for compression tableting. The average weight of the uncoated tablet is 240 mg±5%. The typical shelf life of these tablets is 3 years.

The process of preparation of each component also represents modifications in the process to achieve the desired effects. The immunomodulatory effect, the anti-inflammatory and anti-oxidant activities are additional known common features of all the three components. The pharmaceutical herbo-mineral-metallic composition thus selected and processed has the combined effect of minimizing toxicities of conventional therapy, improving Quality of Life throughout the life span, especially in case of debility caused by the disease process and the conventional therapy. The composition is also beneficial in increasing OS and DFS in cancer patients.

The rationale for selecting the individual components is as follows:

Suvarna bhasma provides proper nourishment to tissues and imparts immunomodulatory action at cellular level.

Mouktik Bhasma imparts cooling effect on tissues and promotes proper nourishment of tissues, and reduces inflammation.

Guduchi sattva obtained from Tinospora plant promotes digestive power, eliminates undigested material and facilitates metabolism. Its action is mainly exhibited by improving gross digestion besides being an immunomodulator.

The pharmaceutical herbo-mineral-metallic composition prepared in accordance with the present disclosure has been found to have the following effects in managing the adverse side effects of chemotherapy. The pharmaceutical herbo-mineral-metallic composition provides nourishment to tissues which is hampered due to conventional systemic anti-cancer therapies. These anti-cancer therapies interfere with normal functions of GI system, produce inflammation in GI system and interfere with the process of absorption of micro nutrients at cellular level. These malfunctions are effectively corrected by the pharmaceutical herbo-mineral-metallic composition. The quantities of Suvarna bhasma, Mouktik bhasma and Guduchi sattva are carefully titrated. Although potency and duration of effectiveness of Suvarna bhasma is satisfactory, the addition of Mouktik bhasma and Guduchi sattva are needed for its easy absorption. In addition, combining Suvarna bhasma with Mouktik bhasma and Guduchi sattva pacifies the aggressiveness of Suvarna Bhasma capacity on the digestive power of the patient as well as absorption at cell and tissue level. Mouktik Bhasma has an antacid effect whereas Guduchi sattva is anti-pyretic and immuno-modulator.

Suvarna bhasma is known as incinerated gold and Mouktik bhasma is known as incinerated pearl.

In accordance with the embodiment of the present disclosure, the Suvarna bhasma is obtained by stabilizing incinerated Suvarna with fresh juice of the leaves of *Ocimum sanctum*.

*Ocimum sanctum*, commonly known as holy basil, Tulsi (sometimes spelled thulasi) or tulsi, is an aromatic perennial plant in the family Lamiaceae. It is native to the Indian subcontinent and widespread as a cultivated plant throughout the tropical Southeast Asia. *Ocimum sanctum* is obtained from Bharatiya Sanskriti Darshan Trust (BSDT), Wagholi, Pune.

The Tinospora plant is selected from *Tinospora cordifolia*, *Tinospora sinensis*, *Tinospora crispa* and *Tinospora glabra*.

*Tinospora cordifolia*, which is known by the common names heart-leaved moonseed, Guduchi, and giloy, is an herbaceous vine of the family Menispermaceae indigenous to the tropical areas of India, Myanmar, and Sri Lanka. *Tinospora cordifolia* is obtained from Bharatiya Sanskriti Darshan Trust (BSDT), Wagholi, Pune.

*Tinospora sinensis* is an herbaceous vine of the family Menispermaceae indigenous to the tropical areas of India, Myanmar and Sri Lanka. *Tinospora sinensis* is collected from Bharatiya Sanskriti Darshan Trust (BSDT), Wagholi, Pune.

In accordance with the embodiment of the present disclosure, the excipient is selected from the group consisting of gum acacia, guar gum, xanthan gum and other edible gums.

Gum acacia, also known as arabic gum, is a natural gum consisting of the hardened sap of various species of the Acacia tree. Originally, gum acacia was collected from *Acacia nilotica* which was called the "gum arabic tree". It is harvested commercially from wild trees, mostly in Sudan (80%) and throughout the Sahel, from Senegal to Somalia—though it is historically cultivated in Arabia and West Asia. Gum acacia is collected from Bharatiya Sanskriti Darshan Trust (BSDT), Wagholi, Pune.

The pharmaceutical herbo-mineral-metallic composition is prepared in the form of a solid unit dosages selected from the group consisting of tablet, pill and capsule.

The pharmaceutical herbo-mineral-metallic composition is administered at a dose of 800 mg to 1000 mg per day by oral administration.

The pharmaceutical herbo-mineral-metallic composition of the present disclosure takes care of the short term adverse side-effects in the early period of treatment. The eventual recurrence of cancer and the distant metastasis appear to be controlled by long term use of the pharmaceutical herbo-mineral-metallic composition of the present disclosure. The long term treatment has further helped in maintaining the Quality of Life of patients throughout their lifespan. The long term survival is linked with longer periods of treatment with the pharmaceutical herbo-mineral-metallic composition of the present disclosure.

In accordance with another embodiment of the present disclosure, there is provided a process for preparing the pharmaceutical herbo-mineral-metallic composition of the present disclosure. The process comprises mixing of Suvarna bhasma, Mouktik bhasma, Guduchi sattva, and at least one excipient to obtain a mixture, wherein the Suvarna bhasma is obtained by stabilizing incinerated Suvarna with fresh juice of the leaves of *Ocimum sanctum* (black Tulsi). Water is added to the mixture to obtain dough, followed by pelletizing to obtain pellets. The pellets are dried to obtain dried pellets. The dried pellets are grinded to obtain granules. The so obtained granules are compressed to obtain the pharmaceutical herbo-mineral-metallic composition of the present disclosure.

The Suvarna bhasma is prepared by the process which comprises amalgamation of Suvarna with metallic mercury and sulphur powder, followed by incinerating amalgamated Suvarna at a temperature in the range of 650° C. to 700° C. to obtain incinerated Suvarna. The incinerated Suvarna is stabilized by triturating with fresh juice of the leaves of *Ocimum sanctum* to obtain stabilized Suvarna. For stabilization Suvarna is incinerated at a temperature in the range of 550° C. to 650° C. to obtain Suvarna bhasma having particle size in the range of 20 to 500 nm.

Gold with mercury forms amalgam as an alloy of mercury which is formed through metallic bonding, with electrostatic attractive force. When sulphur is added it forms black sulphide of mercury. During incineration sulphur melts at 114° C., black sulphide of mercury melts at 130° C. and mercury with sulphur sublimes at 650° C. Sulphide atmosphere under pressure and temperature increases solubility of gold which helps reduce particle size of gold and eliminate mercury from the amalgam in the form of sublimates.

The Mouktik bhasma is prepared by the process which comprises purification of Mouktik (pearl) in butter milk having Mouktik to buttermilk ratio of 1:4 (w/v) and buttermilk having curd to water ratio of 1:2 (w/v) and pH in the range of 3 to 4 to obtain purified Mouktik. The purified Mouktik is triturated with Rose water having Mouktik to rose water ratio as 1:0.5 (w/v), followed by incinerating at 700° C. to 750° C. to obtain Mouktik bhasma.

The Guduchi sattva is prepared by the process which comprises macerating stem pieces of Guduchi in water having Guduchi to water ratio as 1:4 (w/v), followed by filtration to obtain a filtrate. The so obtained filtrate is set aside for a period of time in the range of 6 hours to 15 hours or is optionally centrifuged to obtain supernatant and smooth starchy sediment of Guduchi. The supernatant is separated from the mixture to obtain smooth starchy sediment of Tinospora and the smooth starchy sediment is dried at a temperature in the range of 40° C. to 45° C. to obtain the Guduchi sattva.

The *Tinospora* plant is selected from *Tinospora cordifolia*, *Tinospora sinensis*, *Tinospora crispa* and *Tinospora glabra*.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in the light of following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAIL

Example 1: Composition of the Pharmaceutical Herbo-Mineral-Metallic Composition (in the Form of Tablet) in Accordance with the Present Disclosure The pharmaceutical herbo-mineral-metallic composition was prepared using the following ingredients as given in Table-1.

TABLE 1

Pharmaceutical herbo-mineral-metallic composition

| Sr. No. | Contents | Latin name/ English Name | Quantity for 5 kg batch |
|---|---|---|---|
| 1 | Suvarna Bhasma | Incinerated Gold | 210.97 g |
| 2 | Mouktik Bhasma | Incinerated Pearl | 1318.56 g |
| 3 | Extract of Tinospora cordifolia | Starch of Tinospora cordifolia | 2637.1 g |
| 4 | Gum Acacia powder | Binder | 833.33 g |

Experiment 1: Preparation of Suvarna Bhasma

Initially 300 gm of Suvarna foils was amalgamated with 2500 gm of metallic mercury and 2500 gm of sulphur powder having particle size 150 microns and then incinerated 18 times each at 650° C. for 6 hours to get incinerated Suvarna. For stabilization, the incinerated Suvarna was triturated for 6 hours with fresh juice of the leaves of Ocimum sanctum (Tulsi) and further incinerated at 600° C. for 5 hours. This incineration process in Tulsi juice was repeated 25 times to obtain Suvarna Bhasma having particle size in the range of 20-500 nm (average particle size_350_nm) when analysed by particle size analyser (90 plus from Brookhaven Instruments, USA).

Result: Specification of Suvarna Bhasma
  Description—Brown coloured, very fine free flowing powder
  Loss on Drying—NMT 0.5% w/w
  Loss on Ignition—NMT 1% w/w
  Acid insoluble ash—90 to 98% w/w
  Assay as Au—NLT 85% w/w Experiment 2: Preparation of Mouktik Bhasma 8 Kg Mouktik (pearl) was boiled in 32 L of butter milk having curd to water ratio of 1:2 w/v and pH of 3, to obtain purified Mouktik. The so obtained purified Mouktik was powdered and triturated with 4 L of rose water to obtain triturated powder. The triturated powder was then incinerated using cow-dung cakes at 700° C. to obtain Mouktik Bhasma (incinerated pearl).

Result: Specification of Mouktik Bhasma:
  Description: Greyish white coloured, very fine powder
  Loss on Drying—NMT 0.5% w/w
  Acid insoluble ash—NMT 2% w/w
  Calcium assay—38 to 40% w/w
  pH—10 to 11

Experiment 3: Extraction of Starch from Tinospora cordifolia/sinenses

50 Kg of Fresh stems of Tinospora cordifolia were chopped into small pieces. These pieces were crushed and then soaked for 12 hours in 4 times (w/v) of potable water (200 L) in a stainless steel vessel. The mixture was macerated in water thoroughly and filtered slowly to obtain solution containing aqueous extract of Tinospora cordifolia. The solution thus obtained was kept aside for 12 hours to obtain supernatant and smooth starchy sediment of Tinospora cordifolia. The supernatant was carefully separated to obtain smooth starchy sediment. The smooth starchy sediment of Tinospora cordifolia was evaporated in an oven at 45° C. to obtain Guduchi Sattva in the form of dry starch.

Result: Specification of Starch Extract of Tinospora cordifolia/Sinensis
  Description: White or greyish white coloured very fine free flowing starchy powder
  Loss on Drying—NMT 5% w/w
  Acid insoluble ash—NMT 1% w/w
  Gelation temperature—60 to 75° C.

Experiment 4: Preparation of the Pharmaceutical Herbo-Mineral-Metallic Composition The pharmaceutical herbo-mineral-metallic composition was prepared in three batches as per details given in Table 2

TABLE 2

Pharmaceutical herbo-mineral-metallic composition in three batches

| Sr. No. | Contents | Latin name/ English Name | Quantity for 5 kg batch 1 | Quantity for 5 kg batch 2 | Quantity for 5 kg batch 3 |
|---|---|---|---|---|---|
| 1 | Suvarna Bhasma | Incinerated Gold | 210.97 g | 110 g | 350 g |
| 2 | Mouktik Bhasma | Incinerated Pearl | 1318.56 g | 1700 g | 1000 g |
| 3 | Extract of Tinospora cordifolia | Starch of Tinospora cordifolia | 2637.1 g | 2940 g | 2250 g |
| 4 | Gum Acacia powder | Binder | 833.33 g | 250 g | 1400 g |

In a mixer, 210.97 gm of Suvarna bhasma, 1318.56 gm of Mouktik bhasma, 2637.1 gm of Guduchi Sattva (starch from *Tinospora cordifolia*) and 833.33 gm of gum acacia were mixed to obtain a mixture. The amounts are given in Table 1. To this mixture, 3 L of water was added to obtain dough. The dough was further pelletized to obtain pellets. The so obtained pellets were dried in oven at 45° C. to obtain dried pellets. The dried pellets were grinded to obtain granules having powder to granule ratio of 30:70. The so obtained granules were compressed in a tablet punching machine to obtain compressed tablet of weight 237 mg±5% each.

Results: Specifications of the Pharmaceutical Herbo-Mineral-Metallic Composition Appearance: Grey colour, round
Shape: Biconvex tablets
Weight variation: 0.2250 to 0.2500 g
Average weight: 237±12 mg
Hardness: 1-2 Kg/cm$^2$
Friability: NMT 1% w/w
Disintegration Time: NMT 30 min
Diameter: 7 to 7.5 mm
Width: 3.3 to 4.6 mm
Acute toxicity: LD 50>2000 mg/kg Experiment 5: Elemental Analysis of the Pharmaceutical Herbo-Mineral-Metallic Composition The below mentioned studies have been conducted for the pharmaceutical herbo-mineral-metallic composition of batch 1.

The pharmaceutical herbo-mineral-metallic composition was tested for elemental assay for gold (Au) and calcium (Ca) (Table 3) and for heavy metal analysis of mercury (Hg), lead (Pb), cadmium (Cd) and arsenic (As) (Table 4).

Results:

TABLE 3

Elemental assay for gold and calcium in the pharmaceutical herbo-mineral-metallic composition

| Name of element | Mean of 3 samples | Max. Dose per day in mg | SD | p Value | Permissible limit per day |
|---|---|---|---|---|---|
| Gold | 2.64% | 20.82 | 0.09 | 0.0004 | 100 mg |
| Calcium | 13.1% | 103.49 | 0.12 | <0.0001 | 1000-1200 mg |

TABLE 4

Heavy metals analysis of the pharmaceutical herbo-mineral-metallic composition

| Name of element | Mean of 3 samples | Max. Dose per day in ppm | SD | p Value | Permissible limit per day |
|---|---|---|---|---|---|
| Cadmium | 1.28 ppm | 1.28 | 0.23 | 0.01 | <3 ppm |
| Mercury | 0.83 ppm | 0.83 | 0.0005 | <0.0001 | <1 ppm |
| Lead | 17.02 ppm | 17.02 | 0.01 | <0.0001 | <20 ppm |
| Arsenic | Nil | Nil | — | — | <0.3 ppm |

From Tables 3 and 4, it is evident that gold and calcium content and heavy metal content of the pharmaceutical herbo-mineral-metallic composition were within permissible limits.

Experiment 6: Toxicity Studies of the Pharmaceutical Herbo-Mineral-Metallic Composition The pharmaceutical herbo-mineral-metallic composition was also tested for acute and chronic toxicity studies on rats (Animal toxicity studies were conducted at ACTREC, Tata Memorial Centre, Navi Mumbai).

Acute Toxicity Study of the Pharmaceutical Herbo-Mineral-Metallic Composition—

Acute toxicity study of the pharmaceutical herbo-mineral-metallic composition was conducted for 2000 mg/kg single dose for 14 days in Sprague Dawley rats. One of the contents of the pharmaceutical herbo-mineral-metallic composition was Suvarna Bhasma (2.64% of Gold) and its daily dose was 41.64 mg. The pharmaceutical herbo-mineral-metallic composition of the present disclosure showed all the biochemical and haematological parameters within normal limits at the end of the experiment as shown in table 5.

TABLE 5

Acute toxicity studies of the pharmaceutical herbo-mineral-metallic composition: Biochemical and hematological analysis

| Parameters | Normal control (n = 4) | | Vehicle (Cow's ghee) control (n = 10) | | The pharmaceutical herbo-mineral-metallic composition (n = 10) | |
|---|---|---|---|---|---|---|
| | 0 day | 14 day | 0 day | 14 day | 0 day | 14 day |
| Biochemical parameters (mean ± sd) | | | | | | |
| BUN | 27.75 ± 2.66 | 27.75 ± 2.66 | 25.45 ± 1.47 | 36.50 ± 1.22 | 33.41 ± 2.49 | 12.66 ± 5.16 |
| Sr. creatinine | 0.42 ± 0.06 | 0.42 ± 0.06 | 0.50 ± 0.03 | 0.57 ± 0.01 | 0.30 ± 0.03 | 0.34 ± 0.09 |
| Bilirubin | 0.13 ± 0.03 | 0.13 ± 0.03 | 0.11 ± 0.02 | 0.25 ± 0.13 | 0.07 ± 0.02 | 0.22 ± 0.01 |
| SGOT | 108.75 ± 7.83 | 108.75 ± 7.83 | 208.70 ± 32.40 | 146.50 ± 9.78 | 218.30 ± 13.80 | 166.10 ± 6.48 |
| SGPT | 64.75 ± 7.49 | 64.75 ± 7.49 | 79.90 ± 11.68 | 73.30 ± 10.22 | 71.60 ± 7.70 | 51.10 ± 4.99 |
| Alkaline Phosphate | 395.00 ± 44.22 | 395.00 ± 44.22 | 396.60 ± 21.66 | 325.40 ± 22.07 | 398.80 ± 16.27 | 334.00 ± 25.53 |
| Haematological parameters (mean ± sd) | | | | | | |
| WBC | 7.76 ± 0.45 | 7.76 ± 0.45 | 6.67 ± 0.51 | 5.68 ± 0.58 | 4.76 ± 0.21 | 8.08 ± 0.38 |
| RBC | 7.34 ± 0.19 | 7.34 ± 0.19 | 7.56 ± 0.12 | 7.68 ± 0.09 | 7.89 ± 0.01 | 7.19 ± 0.30 |
| Hb | 13.90 ± 0.16 | 13.90 ± 0.16 | 14.13 ± 0.18 | 14.08 ± 0.33 | 14.18 ± 0.19 | 14.13 ± 0.06 |
| Platelets | 876.00 ± 48.63 | 876.00 ± 48.63 | 788.90 ± 44.55 | 913.10 ± 51.30 | 709.00 ± 28.12 | 753.30 ± 25.52 |
| Neutrophils | 5.15 ± 0.59 | 5.15 ± 0.59 | 3.74 ± 0.99 | 3.75 ± 0.57 | 3.53 ± 1.17 | 1.74 ± 0.47 |
| Lymphocytes | 83.65 ± 1.54 | 83.65 ± 1.54 | 79.09 ± 2.96 | 81.59 ± 2.37 | 73.60 ± 1.17 | 83.45 ± 1.39 |

It was observed that the administration of a single large dose (2000 mg/kg body weight) of the pharmaceutical herbo-mineral-metallic composition did not show change in behavioral pattern in treated and control rats.

From table 5, it is evident that there was no clinically significant change in various hematological and biochemical parameters.

There was no significant change observed when histopathology of different organs from animals treated with the pharmaceutical herbo-mineral-metallic composition was compared with animals belonging to normal control and vehicle control groups. Thus, from above results, it is concluded that a single large dose of the pharmaceutical herbo-mineral-metallic composition and vehicle (clarified butter or cow's ghee) were well tolerated by the animals without adverse effects.

Chronic Toxicity Study of the Pharmaceutical Herbo-Mineral-Metallic Composition:

Chronic toxicity study of the pharmaceutical herbo-mineral-metallic composition was conducted for 30 days in Sprague Dawley rats with therapeutic dose (x), and (5x) and (10x) doses. One of the contents of the pharmaceutical herbo-mineral-metallic composition was Suvarna Bhasma (2.64% of Gold) and its daily dose was 41.64 mg. The pharmaceutical herbo-mineral-metallic composition of the present disclosure showed all the biochemical and haematological parameters within normal range as shown in table 6.

TABLE 6

Chronic toxicity studies of the pharmaceutical herbo-mineral-metallic composition: Biochemical and hematological analysis.

| Parameter | X dose | | 5X dose | | 10 X dose | |
|---|---|---|---|---|---|---|
| | 0 day | 30 day | 0 day | 30 day | 0 day | 30 day |
| Biochemical parameters (mean ± sd) | | | | | | |
| BUN | 28.70 ± 1.51 | 29.45 ± 2.15 | 35.7 ± 0.87 | 36.17 ± 2.02 | 38.45 ± 2.08 | 32.63 ± 2.90 |
| Sr. creat. | 0.67 ± 0.19 | 0.77 ± 0.14 | 0.40 ± 0.03 | 0.42 ± 0.035 | 0.37 ± 0.02 | 0.38 ± 0.03 |
| Bilirubin | 0.16 ± 0.03 | 0.24 ± 0.04 | 0.17 ± 0.02 | 0.21 ± 0.03 | 0.14 ± 0.03 | 0.15 ± 0.02 |
| SGPT | 66.00 ± 3.13 | 39.33 ± 4.41 | 36.67 ± 3.07 | 28.50 ± 2.31 | 40.83 ± 1.92 | 28.33 ± 4.64 |
| SGOT | 285.7 ± 45.8 | 265.2 ± 39.4 | 166.7 ± 9.4 | 162.3 ± 9.0 | 160.5 ± 9.1 | 145.7 ± 14.3 |
| Alkaline phosphatase | 268.00 ± 13.2 | 257.00 ± 17.7 | 149 ± 15.7 | 116.5 ± 14.5 | 195.17 ± 14.3 | 106.2 ± 6.2 |
| Haematological parameters (mean ± sd) | | | | | | |
| HB | 14.850 ± 0.14 | 14.42 ± 0.16 | 15.72 ± 0.39 | 16.2 ± 0.26 | 16.0 ± 0.40 | 16.27 ± 0.27 |
| WBC | 6.150 ± 0.5 | 4.5 ± 0.85 | 7.55 ± 0.70 | 8.82 ± 0.47 | 7.2 ± 0.66 | 7.51 ± 0.70 |
| RBC | 8.433 ± 0.07 | 7.8 ± 0.07 | 9.11 ± 0.24 | 8.9 ± 0.13 | 9.1 ± 0.23 | 9.20 ± 0.20 |
| Platelets | 833.50 ± 108.4 | 644.7 ± 56.2 | 760.5 ± 20.57 | 813.7 ± 42.16 | 742.2 ± 14.11 | 703.2 ± 52.7 |
| Neutrophils | 9.367 ± 3.0 | 4.0 ± 1.5 | 7.2 ± 0.98 | 5.6 ± 1.26 | 3.4 ± 0.29 | 8.3 ± 1.82 |
| Lymphocytes | 63.850 ± 3.9 | 71.1 ± 1.6 | 64.08 ± 4.32 | 72.9 ± 3.72 | 64.4 ± 0.10 | 63.9 ± 6.33 |
| Monocytes | 14.72 ± 1.4 | 12 ± 0.9 | 13.83 ± 1.9 | 14.6 ± 2.10 | 19.23 ± 0.69 | 15.5 ± 3.98 |

From table 6, it is evident that daily administration of the pharmaceutical herbo-mineral-metallic composition at therapeutic dose, 5 times and 10 times of therapeutic dose given for 30 days did not produce any hematological and biochemical changes in rats when compared to vehicle control and normal control. Thus, the pharmaceutical herbo-mineral-metallic composition is considered safe for long term use. Further, human equivalent dose of up to 100 mg daily is considered to be safe.

Example 2: Efficacy Studies of the Pharmaceutical Herbo-Mineral-Metallic Composition on Various Types of Cancers The therapeutic effectiveness in terms of improving quality of life (QoL); extending overall survival (OS) and disease free survival (DFS) of the pharmaceutical herbo-mineral-metallic composition was assessed on 124 patients. These patients belonged to both genders and age group between 20 to 78 years suffered from various types of cancers at different stages. These patients were recruited before, during or after conventional anti-cancer treatment such as surgery, radiotherapy, chemotherapy and hormonal treatment and were given herbo-mineral-metallic composition of the present disclosure from 1 to 6 years. These patients were categorized based on duration of treatment with the pharmaceutical herbo-mineral-metallic composition, viz treated for 1-2 years (Group 1: 88 patients), 2-4 years (Group 2: 26 patients) and 4-6 years (Group 3: 10 patients). While 2 children of age 3 years suffering from leukemia were recruited and administered half of the adult dose in this study.

Experiment 1: Assessment of Biochemical Parameters and Quality of Life of Cancer Patients Treated with the Herbo-Mineral-Metallic Composition from 1 Year and 6 Years The distribution of patients having different types of cancers and the stages of the disease included in the study are given in table 7.

Outcome Measures—

The assessment criteria for outcome measures include biochemical parameters like haemogram, liver function and kidney function; clinical parameters such as clinical examinations and radiological investigations. For assessment of well-being measures like Karnofsky score, Functional, Global, and Symptom scores of QLQ were used. Karnofsky score and scoring for QLQ are internationally accepted means of scoring symptoms and quality of life for cancer patients used in various studies in clinical trials. Karnofsky score was recorded on 0-100 scale, the score of 100 showing normal performance status.

Observations and Results—

As given in table 7 the cohort includes 60% breast cancer, 13% oral cavity cancers and remaining 27% other types of cancers. Among these, 14% patients were in stage IV, 45% in stage III, 34% in stage II and 7% in stage I cancer. One brain tumour patient belongs to grade II, one CML patient to accelerated stage, and one AML patient to M4 stage.

TABLE 7

Distribution of cancer types and stages of the disease in the cohort included in the study

| Sr. No. | Diagnosis | Total No. of Patients | Stage-wise distribution of patients | | | |
|---|---|---|---|---|---|---|
| | | | Stage I | Stage II | Stage III | Stage IV |
| 1 | CA Breast | 76 | 2 | 36 | 30 | 8 |
| 2 | CA Lung | 7 | 0 | 1 | 1 | 5 |
| 3 | CA Ovaries | 6 | 0 | 1 | 4 | 1 |
| 4 | CA Buccal Mucosa | 5 | 1 | 1 | 0 | 3 |
| 5 | CA Tongue | 3 | 0 | 0 | 2 | 1 |
| 6 | Non-Hodgkin's lymphoma | 3 | 0 | 1 | 2 | 0 |
| 7 | CA Alveolus | 2 | 0 | 1 | 0 | 1 |
| 8 | CA Pharynx | 2 | 0 | 0 | 1 | 1 |
| 9 | CA Pyriform fossa | 2 | 0 | 0 | 1 | 1 |
| 10 | Hodgkin's lymphoma | 2 | 0 | 0 | 2 | 0 |
| 11 | Myeloid leukemia | 2 (1—AML/M4, 1—Accelerated CML) | NA | NA | NA | NA |
| 12 | CA Stomach | 1 | 0 | 1 | 0 | 0 |
| 13 | CA Colon | 1 | 0 | 1 | 0 | 0 |
| 14 | CA Rectum | 1 | 1 | 0 | 0 | 0 |
| 15 | CA Gall bladder | 1 | 0 | 0 | 1 | 0 |
| 16 | CA Pancreas | 1 | 0 | 1 | 0 | 0 |
| 17 | CA Maxilla | 1 | 0 | 0 | 0 | 1 |
| 18 | CA Larynx | 1 | 0 | 0 | 0 | 1 |
| 19 | Sarcoma | 1 | 0 | 0 | 0 | 1 |
| 20 | CA Cervix | 1 | 0 | 0 | 0 | 1 |
| 21 | CA Prostate | 1 | 0 | 0 | 0 | 1 |
| 22 | Brain Tumours (Grade) | 1 | 0 | 1 | 0 | 0 |
| 23 | Multiple Myeloma | 1 | 1 | 0 | 0 | 0 |
| 24 | Lymphatic leukemia | 1 | NA | NA | NA | NA |
| 25 | Primary Multiple cancer | 1 | 0 | 1 | 0 | 0 |
| | TOTAL | 124 | 5 | 45 | 44 | 26 |

NA—Not Applicable or not defined

Biochemical Parameters—

Biochemical parameters of 124 cancer patients were studied before and after treatment with the pharmaceutical herbo-mineral-metallic composition of the present disclosure (FIGS. 1A to 1H). From FIGS. 1A to 1H, it is observed that the haemoglobin levels increased while Serum alkaline phosphatase, an indicator of disease progression, showed remarkable decrease after treatment with the pharmaceutical herbo-mineral-metallic composition in patients of all the 3 groups. All other parameters showed a trend towards better outcome and were in normal range throughout the study.

Figure 2A:
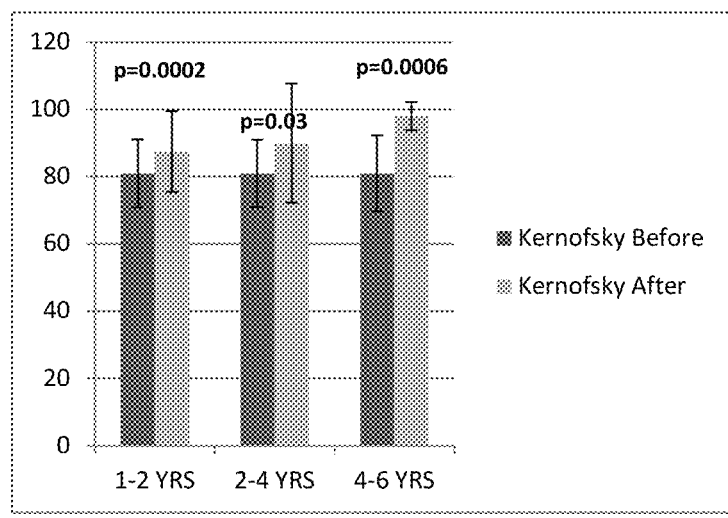
FIG. 2A depicts a graphical representation of Karnofsky score before and after the pharmaceutical herbo-mineral metallic composition treatment in cancer patients.

Well-being of Patients (Recorded as Karnofsky Score, QoL Scores and Weight):

Parameters of well-being were evaluated before and after the treatment with the pharmaceutical herbo-mineral-metallic composition and the results were represented as FIGS. 2A to 2E. As shown in FIG. 2A, Karnofsky score was highly significant ($p=0.0002$) in Group 1 and ($p=0.0006$) in Group 3 while significant ($p=0.03$) in Group 2.

Figure 2B:
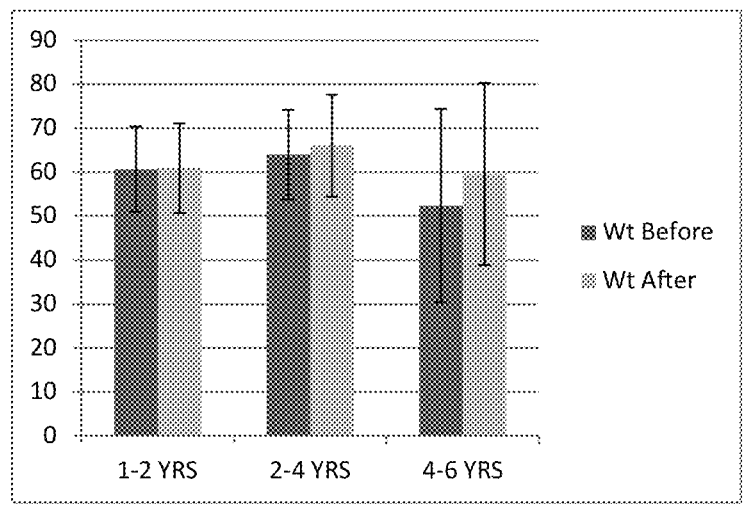
FIG. 2B depicts a graphical representation of weight before and after the pharmaceutical herbo-mineral metallic composition treatment in cancer patients.

As per FIG. 2B, there was no significant change in weight in all the three groups. Thus chemotherapy/radiotherapy induced weight loss was not seen in patients treated with the pharmaceutical herbo-mineral-metallic composition.

Figure 2C:
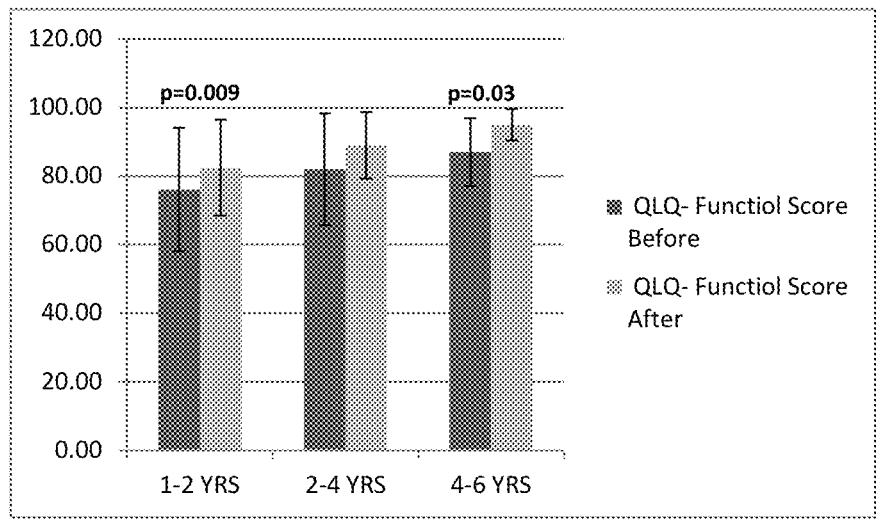
FIG. 2C depicts a graphical representation of QLQ-Functional score before and after the pharmaceutical herbo-mineral metallic composition treatment in cancer patients.
Figure 2D:
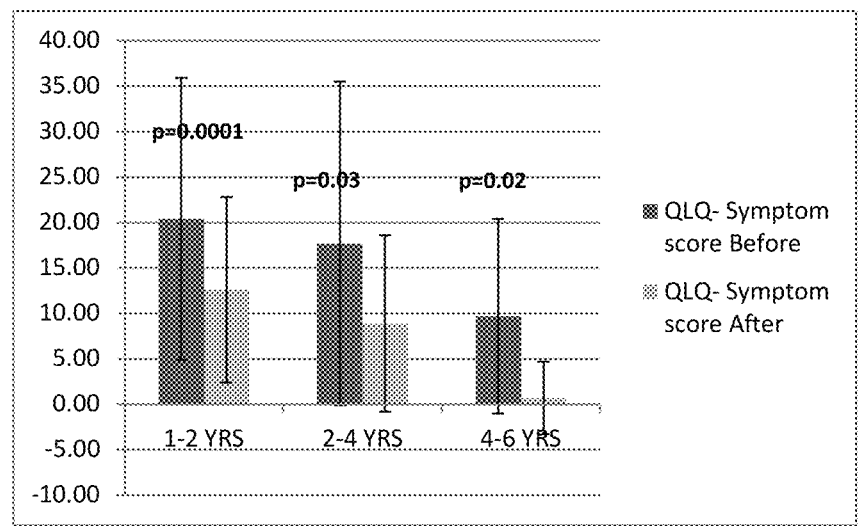
FIG. 2D depicts a graphical representation of QLQ-Symptom score before and after the pharmaceutical herbo-mineral metallic composition treatment in cancer patients.
Figure 2E:
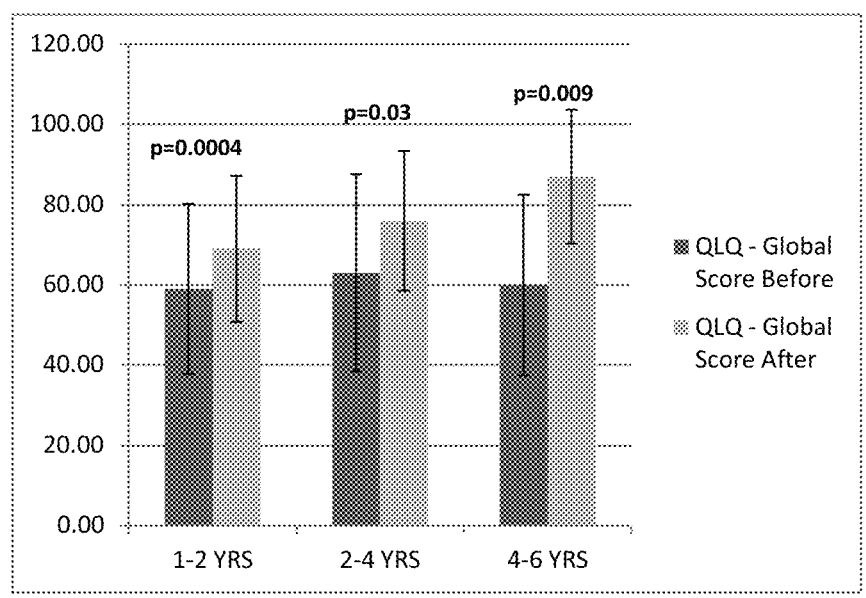
FIG. 2E depicts a graphical representation of QLQ-Global score before and after the pharmaceutical herbo-mineral metallic composition treatment in cancer patients.

In this study, it was observed that functional and global scores increased in all the 3 groups of the patients (FIGS. 2C and 2E). As shown in FIG. 2C, the differences were highly or very highly significant respectively in group 1 and 3, while in case of global score group, 1 and 3 showed highly significant and group 2 showed significant difference (FIG. 2E), Similarly as depicted in FIG. 2D significant or highly significant reduction in symptoms was observed in all three groups of the patients. Notably, a very highly significant reduction in symptoms was observed in group 1 patients during crucial period of 1-2 years, when patients suffered from intermediate and long-term side-effects of chemotherapy and radiotherapy.

Based on these results, it is evident that the pharmaceutical herbo-mineral-metallic composition of present disclosure improved well-being and strength of the patients, thus resulting into improving QoL.

Experiment 2

Figure 3:
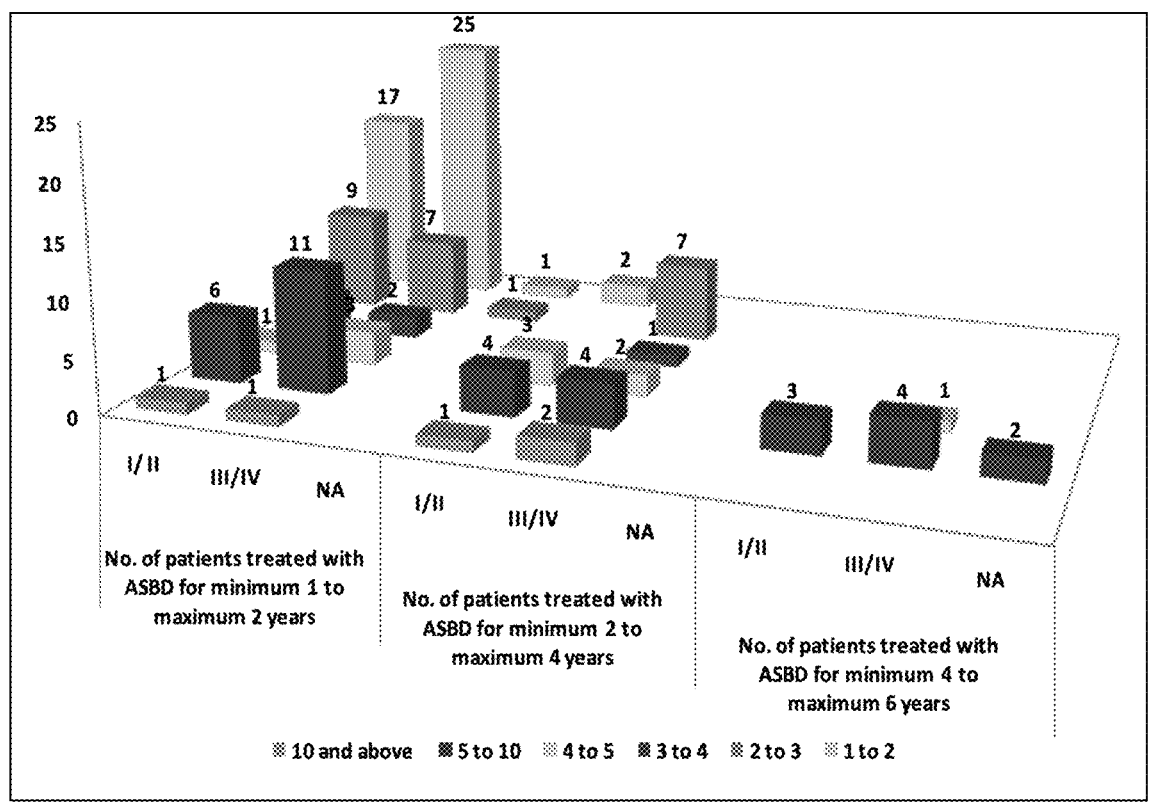
FIG. 3 depicts a graphical representation of survival pattern of patients in different stages of cancer treated with the pharmaceutical herbo-mineral metallic composition in three groups as per period of treatment.

Survival Pattern of Analysis of 124 Patients Treated with the Pharmaceutical Herbo-Mineral-Metallic Composition of the Present Disclosure (ASBD) Vis-à-Vis Period of Treatment and Period of Survival Survival pattern of patients in terms of Disease Free Survival (DFS) and Overall Survival (OS) was analyzed and given in table 8 and FIG. 3. As explained in experiment 1 of example 2, cancer patients were categorized in 3 groups based on duration of treatment with the pharmaceutical herbo-mineral-metallic composition, viz those treated for 1-2 years (Group 1: 88 patients), 2-4 years (Group 2: 26 patients) and 4-6 years (Group 3:10 patients). The life span of patients in DFS or OS status was observed for the period of survival and classified as survival for 1-2 years, 2-3 years, 3-4 years, 4-5 years, 5-10 years, and above 10 years.

Results—

For ease of interpretation of data in terms of OS and DFS, stage I and II patients were grouped together and stage III and IV patients were combined. It was possible because stage I and II patients have better survival, localized tumours, may differ in size of tumour however the distant metastasis was never seen. Group III and IV patients have larger primary tumours with local recurrence as well as distant metastasis and were difficult to treat. Table 8 represents actual number of patients showing DFS and OS for various time periods. In addition percent survival data has also been included in each case in table 8.

Major percentage (about 75%) of stage I/II patients treated with the pharmaceutical herbo-mineral-metallic composition in group 1 (treated for 1-2 yrs.) survived only up to 3-4 years, whereas if the treatment was given for longer period (Group 2 & 3), the patients survived beyond 5 years. On the other hand, about 50-70% of patients in stage III/IV in group 1 & 2 survived only up to 3-4 years, however those who have taken long term treatment of the pharmaceutical herbo-mineral-metallic composition (Group 3 and also 2) survived up to 10-15 years, although they belonged to difficult-to-treat stage III and IV. This indicates that patients have longer life if treated for longer time with the pharmaceutical herbo-mineral-metallic composition. Also stage III/IV patients who normally have poor survival, showed extended DFS and OS status when the pharmaceutical herbo-mineral-metallic composition treatment was given for longer period.

Experiment 3

Survival Pattern in Terms of DFS and OS of Patients Survived for More than 4 Years Compared to Clinical Conditions—

Amongst 124 patients, 49 patients who have survived for more than 4 years are included in this study for their DFS or OS status and the results are depicted in table 9.

Results:

Amongst the long survivors, 19 were in stage I/II disease, 28 in stage III/IV disease and 2 patients for whom stage was not specifically defined.

In table 9 the status of survival and clinical parameters were analyzed together to assess improvement in clinical condition compared with disease free survival.

TABLE 8

Survival patterns of number and percentage of patients in different stages, treated with the pharmaceutical herbo-mineral-metallic composition in 3 groups-

| Survival period in years | No. and % of patients treated for minimum 1 to maximum 2 years* (Group 1) | | | | No. and % of patients treated for minimum 2 to maximum 4 years* (Group 2) | | | | No. and % of patients treated for minimum 4 to maximum 6 years* (Group 3) | | | |
|---|---|---|---|---|---|---|---|---|---|---|---|---|
| | Stage | | | | | | | | | | | |
| | I/II No/(%) | III/IV No/(%) | NA** No/(%) | Total No/(%) | I/II No/(%) | III/IV No/(%) | NA** No/(%) | Total No/(%) | I/II No/(%) | III/IV No/(%) | NA** No/(%) | Total No/(%) |
| 1 to 2 | 17 (46) | 25 (51) | 1 (50) | 43/88 (49) | 2 (20) | 0 | 0 | 2/26 (8) | | | | |
| 2 to 3 | 9 (24) | 7 (14) | 1 (50) | 17/88 (19) | 0 | 7 (44) | 0 | 7/26 (27) | | | | |
| 3 to 4 | 3 (8) | 2 (4) | 0 | 5/88 (6) | 0 | 1 (6) | 0 | 1/26 (4) | | | | |
| 4 to 5 | 1 (3) | 3 (6) | 0 | 4/88 (5) | 3 (30) | 2 (13) | 0 | 5/26 (19) | 0 | 1 (20) | | 1/10 (10) |
| 5 to 10 | 6 (16) | 11 (22) | 0 | 17/88 (19) | 4 (40) | 4 (25) | 0 | 8/26 (31) | 3 (100) | 4 (80) | 2 (100) | 9/10 (90) |
| 10 and above | 1 (3) | 1 (2) | 0 | 2/88 (10 and 18 yrs) (2) | 1 (10) | 2 (13) | 0 | 3/26 (11, 12 and 19 yrs) (12) | 0 | 0 | | 0 |
| Total | 37 | 49 | 2 | 88 | 10 | 16 | 0 | 26 | 3 | 5 | 2 | 10 |

*The pharmaceutical herbo-mineral metallic composition treatment discontinued thereafter
**Patients with Leukemia and brain tumour are classified using special type of staging and grading respectively hence are mentioned NA.

TABLE 9

Patients treated with the pharmaceutical herbo-mineral-metallic composition observed after 4+ years for survival vis-à-vis clinical parameters

| | Reduction in disease related symptoms | Reduction in therapy related adverse effects* | Increase in HB | Increase in Weight | Radiological findings | Karnofsky score | QoL assessed by QLQ C-30 |
|---|---|---|---|---|---|---|---|
| Stage I/II Disease -19 patients | | | | | | | |
| DFS - 15/19 | 6/15 | 6/15 | 5/15 | 10/15 | All disease free | Increased in all 90-100 | Improved in all |
| OS - 4/19 | 3/4 | 3/4 | 3/4 | 3/4 | Stable disease in 3 and progressive disease in 1 | Increased in 3/4 80-90 | Improved in all |
| Stage III/IV Disease - 28 patients | | | | | | | |
| DFS- 10/28 | 1/10 | 5/10 | 5/10 | 7/10 | All disease free | Increased in all 90-100 | Improved in all |
| OS- 18/28 | 5/18 | 11/18 | 7/18 | 8/18 | 7 status quo, 11 increased mets. | Status quo score - 80-90, Patients with Increased mets, score around 80 | Improved in patients with status quo disease and maintained in patients with increased metastatic disease. |
| STAGE not defined - 2 patients | | | | | | | |
| DFS2/2 | 2/2 | 2/2 | 2/2 | 2/2 | All disease free | Increased in all 90-100 | Improved in all |

*Adverse effects included nausea, vomiting, fever, fatigue, body ache etc.

Out of 19 patients having stage I/II disease, 15 showed disease free survival (DFS) and 4 showed overall survivals with steady status of the disease (OS). The radiological findings showed disease free condition in all DFS patients while 3 OS patients showed stable status of metastatic disease and 1 patient showed progressive metastasis. Both DFS and OS patients showed improvement in Karnofsky score and quality of life.

As for the patients in stage III/IV treated with the pharmaceutical herbo-mineral-metallic composition and survived for 4+ years, 10 were in DFS status, while 18 showed OS status. This is an encouraging observation wherein 36% patients were diseases free (DFS) and 64% patients were in OS category, which is otherwise not reported often. Among 18 OS patients, 7 patients showed radiologically stable disease condition with good QoL and 11 patients showed progressive disease but with improved QoL.

Experiment 4

Survival Period of Patients of Various Groups of Cancers from the Present Study Vis-a-Vis Known Respective Survival Rates Since the cohort includes cancers of different organs, further analysis of representative 16 cases was carried out and a comparison of survival data with known 5 years relative survival rate (RSR) in percentage for that particular cancer was done. This data is given below in table 10.

Results:

TABLE 10

Effects of the pharmaceutical herbo-mineral-metallic composition treatment on survival period of patients of various groups of cancers vis-a-vis known respective survival rates

| Sr. No. | Diagnosis | Stage | Treatment period | Actual Survival period in years | 5 yr RSR in % |
|---|---|---|---|---|---|
| 1 | CA Ovary + CA Breast | Ovary—IIIC (2006) Breast—IA (2011) | 3.5 (After 2011) | 11.4 | 35 |
| 2 | CA Ovary + CA Breast | Ovary—IIIC (2008) Breast—IA (2011) BRCA 1 +ve | 1.3 (After 2011) | 9.5 | 73 |
| 3 | CA Ovary | IV Local recurrence | 2.7 | 3.2 | 10 |
| 4 | CA Ovary | III/IV Locally advanced disease | 1.7 | 5.7 | 30 |
| 5 | CA Breast | IV Mets in liver and lung Recurrence at site of origin | 4.2 | 4.7 | 22 |
| 6 | CA Tongue | III Recurrence—stage I (2011) | 3.2 (After 2011) | 12.2 | 33 |
| 7 | CA Tongue | III | 1.6 | 4.5 | 55 |
| 8 | CA Colon | Initial Diagnosis (2006)—Stage IIA, Recurrence (2010)—Stage I, Liver Mets | 2 (After 2015) | 9.1 | 8 |

TABLE 10-continued

Effects of the pharmaceutical herbo-mineral-metallic composition treatment on survival period of patients of various groups of cancers vis-a-vis known respective survival rates

| Sr. No. | Diagnosis | Stage | Treatment period | Actual Survival period in years | 5 yr RSR in % |
|---|---|---|---|---|---|
| | | (2011)—Stage IV, Lung Mets (2014) | | | |
| 9 | CA Prostate | IV Bone metastasis | 1.4 | 5 | 3 |
| 10 | CA Lung | IV Brain metastasis | 1.2 | 3.1 | 1 |
| 11 | CA Lung | IIA, progressively advancing disease | 2 | 3 | 30 |
| 12 | PNET* | IV Skeletal metastasis | 3.1 | 8 | 0 |
| 13 | CA Stomach | IIA | 1 | 2.4 | 0 |
| 14 | AML | M4≠5% blasts during maintenance chemotherapy | 6.3 | 6.9 | 26 |
| 15 | Cervix | IVA, Locally advanced disease | 4.8 | 6.3 | 57 |
| 16 | CA Breast with Lung mets | IIA (2008 at initial diagnosis) IV (Lung mets—in 2011) TNBC (A heterozygous 'variant of uncertain significance' (VUS) detected in exon 4 of the MSH6 gene) | 5.7 | 9.2 | 26 |

*Peripheral Neuroectodermal tumour (CD 99 positive) in Brachial plexus

From table 10, it is evident that ten out of sixteen patients have surpassed the 5 years RSR reported. The overall Quality of Life of patients included in the table was remarkably well.

The observations reported in all the above experiments suggests that the pharmaceutical herbo-mineral-metallic composition of the present disclosure can act on the cancers of different organs and histology types and is not selective in nature for its effectiveness. It is proved to be non-toxic and does not develop resistance even when given for a period of 6 years.

The same studies have been carried out for the pharmaceutical herbo-mineral-metallic composition of batch 2 and batch 3. The results found to be similar like batch 1 for batch 2 and batch 3 compositions.

TECHNICAL ADVANCEMENTS

The present disclosure described herein above has several technical advantages including, but not limited to, the realization of the pharmaceutical herbo-mineral-metallic composition:

that alleviates the side effects/toxicities due to chemotherapy and radiotherapy in cancer patients;
that improves overall Quality of Life of cancer patients; and
that improves disease free survival (DFS) and overall survival (OS) of cancer patients.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A pharmaceutical herbo-mineral metallic composition for improving and maintaining quality of life of cancer patients by alleviating adverse effects due to chemotherapy and radiotherapy, said composition, comprising:
   Suvarna bhasma in an amount ranging from 2 wt % to 7 wt % of the total weight of said composition;
   Mouktik bhasma in an amount ranging from 20 wt % to 35 wt % of the total weight of said composition;
   Guduchi sattva in an amount ranging from 45 wt % to 60 wt % of the total weight of said composition; and
   at least one excipient in an amount ranging from 5 wt % to 30 wt % of the total weight of said composition;
   wherein the particle size of said Suvarna bhasma is in the range of 20 nm to 500 nm.

2. The composition as claimed in claim 1, wherein said Suvarna bhasma is obtained by stabilizing incinerated Suvarna having particle size in the range of 125 microns to 150 microns, with fresh juice of *Ocimum sanctum* leaves.

3. The composition as claimed in claim 1, wherein said excipient is a binder.

4. The composition as claimed in claim 3, wherein said binder is selected from the group consisting of gum acacia, guar gum, xanthan gum and other edible gums.

5. The composition as claimed in claim 1, wherein said composition comprises:
   Suvarna bhasma in an amount ranging from 3 wt % to 5 wt % of the total weight of said composition;
   Mouktik bhasma in an amount ranging from 23 wt % to 30 wt % of the total weight of said composition;
   Guduchi sattva in an amount ranging from 48 wt % to 54 wt % of the total weight of said composition; and
   at least one edible binder in an amount ranging from 10 wt % to 25 wt % of the total weight of said composition;
   wherein the particle size of said Suvarna bhasma is in the range of 20 nm to 500 nm.

6. The composition as claimed in claim 1, wherein said composition comprises:
   Suvarna bhasma in an amount of 4 wt % of the total weight of said composition;
   Mouktik bhasma in an amount of 26 wt % of the total weight of said composition;
   Guduchi sattva in an amount of 52 wt % of the total weight of said composition; and
   at least one edible gum in an amount of 18 wt % of the total weight of said composition
   wherein the particle size of said Suvarna bhasma is in the range of 20 nm to 500 nm.

7. The composition as claimed in claim 1, wherein said composition is prepared in the form of solid unit dosages selected from the group consisting of tablet, pill, and capsule.

8. The composition as claimed in claim 1, wherein cancer is selected from the group consisting of breast carcinoma, lung carcinoma, ovaries carcinoma, buccal mucosa carcinoma, tongue carcinoma, Non-Hodgkin's lymphoma, alveolus carcinoma, pharynx carcinoma, pyriform fossa carcinoma, Hodgkin's lymphoma, stomach carcinoma, colon carcinoma, rectum carcinoma, gall bladder carcinoma, pancreas carcinoma, maxilla carcinoma, larynx carcinoma, sarcoma, cervix carcinoma, prostate carcinoma, brain tumour and multiple myeloma.

* * * * *